Feb. 26, 1946.  E. DODSON  2,395,728
CONTROL MEANS FOR OPERATING AT A DISTANCE
THE FLYING CONTROLS OF AIRCRAFT
Filed Oct. 17, 1940                     3 Sheets-Sheet 2
*Fig. 3.*  *Fig. 4.*
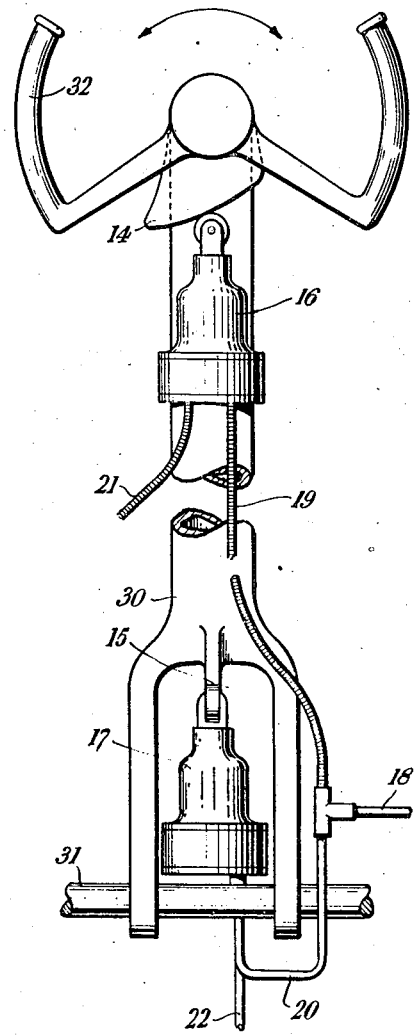
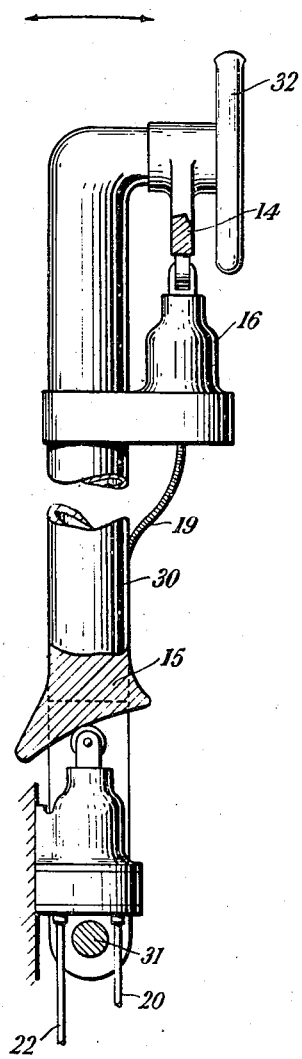
INVENTOR
Edward Dodson
BY *Moses & Nolte*
ATTORNEYS

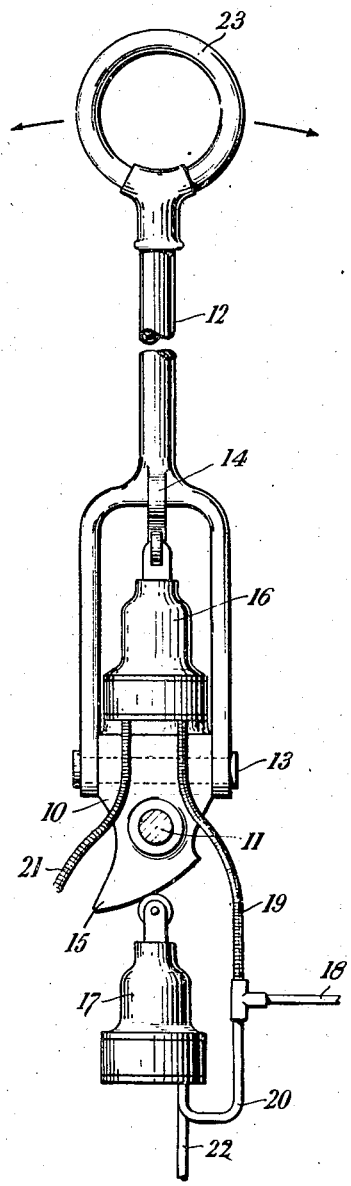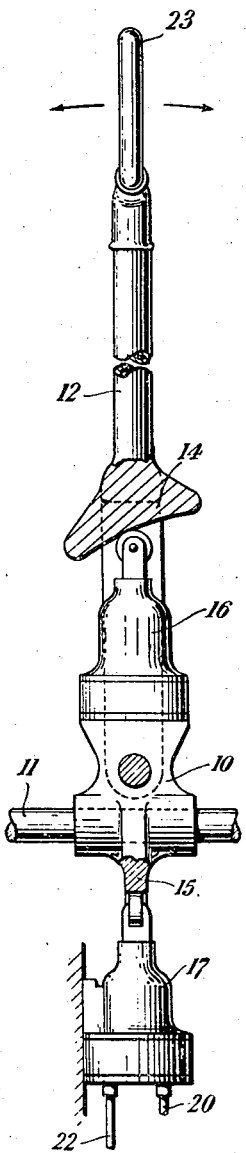

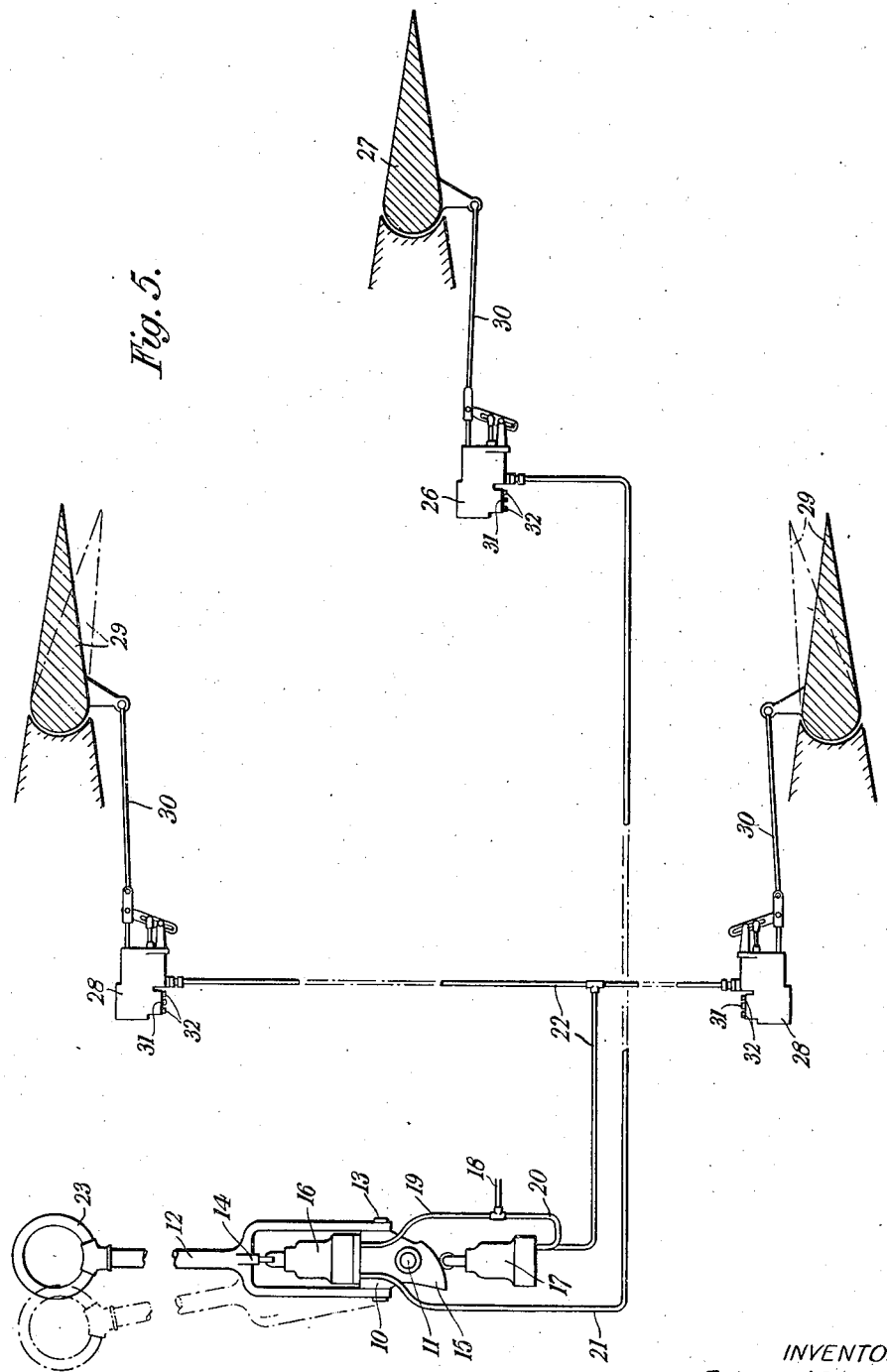

Patented Feb. 26, 1946

2,395,728

UNITED STATES PATENT OFFICE 2,395,728

CONTROL MEANS FOR OPERATING AT A DISTANCE THE FLYING CONTROLS OF AIRCRAFT

Edward Dodson, Putney Heath, London, S. W. 15, England

Application October 17, 1940, Serial No. 361,558
In Great Britain October 25, 1939

3 Claims. (Cl. 244—83)

It is known to control apparatus at a distance by means of a fluid pressure system comprising a sender unit and a receiver unit interconnected by a pipe line, the sender unit being adjustable in accordance with the movement it is desired to communicate to the distant apparatus, and the receiver unit responding to the setting of the sender unit and imparting a corresponding movement to the apparatus.

According to the present invention the joystick of an aircraft is connected to the flying controls by fluid pressure systems of this character, fore and aft movement of the joystick being arranged to operate a sender unit coupled to a receiver unit associated with one flying control (e. g. the elevator) and transverse movement of the joystick being arranged to operate a sender unit coupled to a receiver unit associated with another flying control (e. g. the ailerons). If desired, it may be arranged that rotary movement of the joystick actuates the sender unit of a third system, the receiver unit of which is connected to the rudder, flaps or other flying control.

Two practical embodiments of the invention will now be described in further detail by way of example with reference to the accompanying drawings, in which Figure 1 is a front elevation of one form of joystick for operating flying controls of aircraft in accordance with the invention, Figure 2 is the corresponding side elevation shown partly in section, Figure 3 is the front elevation of an alternative form of joystick, and Figure 4 is the corresponding side elevation.

Figure 5 is a diagram showing the connections between the joystick shown in Fig. 1 and the elevator and ailerons.

Like reference numerals indicate like parts throughout the drawings.

In the arrangement shown in Figures 1 and 2 the joystick comprises a lower part 10 which is mounted for transverse rocking movement on a rod 11 forming part of the aircraft structure. The upper part 12 of the joystick is bifurcated at its lower end and pivoted on a pin 13 carried by the lower part 10 of the joystick so that it can be rocked relatively thereto in a fore and aft direction. The upper part 12 of the joystick carries a cam 14 and the lower part 10 carries a cam 15.

Each part of the joystick is associated with a remote acting fluid pressure system of the kind described in British Patent No. 483,049. The cam 14 associated with the upper part of the joystick controls a sender unit 16 for actuating a receiver unit 26 connected to the elevator 27, while the cam 15 associated with the lower part of the joystick is arranged to actuate a sender unit 17 controlling a pair of receiver units for actuating the ailerons 29 (see Fig. 5). The receiver units and their connections to their associated flying controls are not illustrated in detail but their construction is fully described in British Patent No. 483,049.

The fluid pressure is supplied through an inlet 18 and pipes 19, 20 to the sender units 16, 17 respectively. The pressure is transmitted from the sender units to their associated receiver units through pipes 21, 22. The pipes 19, 21 are flexible.

Each receiver unit comprises an element responsive to the fluid pressure transmitted along the pipe line from its associated sender unit, and is arranged to control the supply of hydraulic pressure to a servo motor, so that the servo motor piston will take up a position corresponding to and determined by the setting of the sender unit and consequently the position of the joystick. The pistons of the servo motor are connected to the flying controls by links 30. As described in British Patent No. 483,049 the hydraulic pressure is admitted to each servo motor, from a source independent of that providing the pressure in the pipe line, through an inlet 31, and is expelled to exhaust through one of two alternative outlets 32 according to the direction of movement of the servo-piston.

When the pilot rocks the joystick in a fore and aft direction the cam 14 will change the setting of the sender unit 16 by an amount proportional to the movement imparted to the joystick and will consequently cause the associated receiver unit 26 to effect a corresponding change in the setting of the elevator 27. When the pilot rocks the joystick in a transverse direction the cam 15 will effect a corresponding change in the setting of the sender unit 17 which consequently, through its receiver units 28, will effect a corresponding displacement of the ailerons 29.

The upper part of the joystick which is gripped by the pilot is in the form of a ring 23 and if desired it can be arranged that this ring can be twisted relatively to the remainder of the joystick and in this way actuate a third fluid pressure system operating the rudder, flaps or some other flying control of the aircraft.

In the arrangement shown in Figures 3 and 4 the joystick is of the wheel type. In this case the lower part 30 of the joystick is movable in a fore and aft direction on a rod 31 fixed to the aircraft and the wheel 32 is pivoted to the top of the joystick so as to be movable relatively thereto about a fore and aft axis. The wheel 32 carries a cam 14 which operates on a sender unit 16 for controlling the ailerons, while the lower part of the joystick carries a cam 15 for controlling the sender unit 17 associated with the elevator. In this case also arrangements can be made whereby a third sender unit can be operated on twisting the wheel 32 around a vertical axis.

Since the remote control systems employed are of the kind described in British Patent No. 483,049 the pressure required in the sender units will be relatively low and flexible connections are suitable, it being remembered that these lines are only signal lines and do not convey the fluid which directly operates the jacks or the like for actuating the controls. Because the effort required to operate a joystick under this system is very light, the joystick can be quite small, the loads being in effect finger light only; and also because the loads are self-contained, no elaborate fixing or strengthening of the aircraft structure is required as compared to the conventional joystick using mechanical controls.

If desired mechanical controls may be used in parallel with the fluid pressure system controls for emergency use, but with small lost motion to allow the fluid pressure systems to take precedence.

What I claim as my invention and desire to secure by Letters Patent is:

1. A joystick for an aircraft, comprising a lower part adapted to pivot relatively to the aircraft structure, a cam fixed to and projecting from said lower part and adapted to coact with a pressure transmitting unit to vary the setting thereof in accordance with changes in position of said lower part in relation to the aircraft structure, an upper part pivoted to the lower part for movement about an axis at right angles to and located above the pivotal axis of the lower part, and a cam fixed to and projecting from said upper part and adapted to coact with a second pressure transmitting unit to vary the setting thereof in accordance with changes in position of said upper part in relation to the lower part.

2. A joystick for an aircraft, comprising a lower part adapted to pivot relatively to the aircraft structure about a fore and aft axis, a cam fixed to and projecting from said lower part and adapted to coact with a pressure transmitting unit to vary the setting thereof in accordance with changes in adjustment of said lower part in relation to said fore and aft axis, an upper part mounted for pivotal adjustment in relation to said lower part about a transverse axis located above said fore and aft axis, and a cam fixed to and projecting from said upper part and adapted to coact with a second pressure transmitting unit to vary the setting thereof in accordance with changes in adjustment of said upper part in relation to said transverse axis.

3. A joystick for an aircraft, comprising a lower part adapted to pivot relatively to the aircraft structure about a transverse axis, a cam fixed to and projecting from said lower part and adapted to coact with a pressure transmitting unit to vary the setting thereof in accordance with changes in adjustment of said lower part in relation to said transverse axis, an upper part mounted for pivotal adjustment in relation to said lower part about a fore and aft axis located above said transverse axis, and a cam fixed to and projecting from said upper part and adapted to coact with a second pressure transmitting unit to vary the setting thereof in accordance with changes in adjustment of said upper part in relation to said fore and aft axis.

EDWARD DODSON.